US012766576B2

(12) United States Patent
Nozaki et al.

(10) Patent No.: US 12,766,576 B2
(45) Date of Patent: Oct. 20, 2026

(54) BINDER COMPOSITION FOR SOIL AND SOLIDIFICATION TREATMENT METHOD FOR SOIL

(71) Applicants: Rutgers, The State University of New Jersey, New Brunswick, NJ (US); Taiheiyo Cement Corporation, Tokyo (JP)

(72) Inventors: Takahito Nozaki, Chiba (JP); Yasuhide Higo, Chiba (JP); Robert Miskewitz, Cranford, NJ (US); Ali Maher, Skillman, NJ (US)

(73) Assignees: RUTGERS, THE STATE UNIVERSITY OF NEW JERSEY, New Brunswick, NJ (US); TAIHEIYO CEMENT CORPORATION, Tokyo (JP)

( * ) Notice: Subject to any disclaimer, the term of this patent is extended or adjusted under 35 U.S.C. 154(b) by 918 days.

(21) Appl. No.: 17/755,109

(22) PCT Filed: Oct. 22, 2020

(86) PCT No.: PCT/US2020/056759

§ 371 (c)(1),
(2) Date: Apr. 21, 2022

(87) PCT Pub. No.: WO2021/081151

PCT Pub. Date: Apr. 29, 2021

(65) Prior Publication Data

US 2022/0355352 A1 Nov. 10, 2022

Related U.S. Application Data

(60) Provisional application No. 62/924,520, filed on Oct. 22, 2019.

(51) Int. Cl.

| | |
|---|---|
| ***B09C 1/08*** | (2006.01) |
| ***C04B 18/08*** | (2006.01) |
| ***C04B 22/06*** | (2006.01) |
| ***C04B 22/14*** | (2006.01) |
| ***C04B 28/02*** | (2006.01) |

(52) U.S. Cl.

CPC ................ *B09C 1/08* (2013.01); *C04B 18/08* (2013.01); *C04B 22/066* (2013.01); *C04B 22/143* (2013.01); *C04B 22/149* (2013.01); *C04B 28/02* (2013.01)

(58) Field of Classification Search

CPC ............ B09C 1/08; C04B 18/08; C04B 28/02

See application file for complete search history.

(56) References Cited

U.S. PATENT DOCUMENTS

| | | | | |
|---|---|---|---|---|
| 4,209,335 | A * | 6/1980 | Katayama | B09C 1/08 106/709 |
| 5,346,550 | A * | 9/1994 | Kunzi | C04B 28/14 106/735 |
| 5,347,077 | A | 9/1994 | Hooykaas et al. | |
| 5,376,283 | A | 12/1994 | Hooykaas | |
| 5,429,751 | A | 7/1995 | Hooykaas | |
| 8,343,271 | B1 | 1/2013 | Lu et al. | |
| 2004/0245178 | A1 | 12/2004 | Schwetlick | |

FOREIGN PATENT DOCUMENTS

| | | | | |
|---|---|---|---|---|
| FR | 3077998 | A1 * | 8/2019 | C04B 28/065 |

OTHER PUBLICATIONS

Zhang et al. Cement and Concrete Research, vol. 26, No. 10, pp. 1505-1511 (Year: 1996).*

Roskovic et al. Cement & Concrete Composites 33 (2011) 1020-1025 (Year: 2011).*

Miyazawa et al. Construction and Building Materials 61 (2014) 90-96 (Year: 2014).*

Park et al. Materials 2015, 8, 5098-5111 (Year: 2015).*

Rios et al. Sustainability 2019, 11, 1702 (Year: 2019).*

Machine translation of FR-3077998-A1 (Year: 2019).*

Bulut et al: "Leaching Behavior of Pollutants in Ferrochrome Arc Furnace Dust and its Stablization/Solidification Using Ferrous Sulphate and Portland Cement", Journal of Hazardous Materials, 2009, vol. 162, pp. 893-898.

* cited by examiner

*Primary Examiner* — Amber R Orlando
*Assistant Examiner* — Ryan Patrick Loughran
(74) *Attorney, Agent, or Firm* — FOX ROTHSCHILD LLP

(57) ABSTRACT

A binder composition for immobilizing a toxic-containing material. This composition has excellent strength developing properties at low temperature and is capable of solidifying soil to suppress the elution of toxic materials from the soil.

19 Claims, 4 Drawing Sheets

BINDER COMPOSITION FOR SOIL AND SOLIDIFICATION TREATMENT METHOD FOR SOIL

FIELD

The present disclosure relates to a binder composition for immobilizing a toxic-containing material.

BACKGROUND

Industrialization has led to widespread environmental pollution over the past few decades. Due to the lack of effective treatment of toxic agents, they often precipitate into soil and sometimes further elute into water streams. For instance, more than 200,000 tons of contaminated soil are dredged from the Hudson-Raritan estuary and the New Jersey and New York harbor annually. This soil needs to be treated and stabilized to prevent harmful contaminants from leaching into waterways and ground aquifers.

SUMMARY

The patent document discloses a solidification composition including a calcium silicate-containing component having hydration reactivity and a sulfate salt. This composition has excellent strength developing properties at low temperature and is capable of solidifying soil to suppress the elution of toxic agents such as arsenic from the soil.

An aspect of the disclosure provides a binder composition for immobilizing a toxic-containing material. The binder composition generally includes a calcium silicate-containing composition having hydration reactivity and a sulfate salt. The calcium silicate-containing composition and the sulfate are selected so that the binder composition is capable of forming an immobilized sediment at 4° C. in about 7 days after being mixed with the toxic-containing material, thereby immobilizing the toxic-containing material.

In some embodiments, the calcium silicate-containing composition contains cement, blast furnace slag fine powder, fly ash, clinker ash, or any combination thereof.

In some embodiments, the binder composition includes a hydraulic cement comprising $(CaO)_3{\cdot}SiO_2(C_3S)$, wherein the $C_3S$ is more than about 60% by weight in the composition; and $FeSO_4$ or anhydrous $CaSO_4$.

In some embodiments, the hydraulic cement further contains $(CaO)_2{\cdot}SiO_2(C_2S)$, and optionally at least one of $(CaO)_3{\cdot}Al_2O_3$ and $(CaO)_4{\cdot}Al_2O_3{\cdot}Fe_2O_3$.

In some embodiments, the $C_3S$ ranges from about 45% to about 80% by weight in the composition, and the $FeSO_4$ or the anhydrous $CaSO_4$ ranges from about 4% to about 15% by weight in the composition. In some embodiments, the $C_3S$ ranges from about 55% to about 75% by weight in the composition, and the anhydrous $CaSO_4$ ranges from about 6% to about 12% by weight in the composition. In some embodiments, the $C_3S$ is over 60% by weight in the composition, and the anhydrous $CaSO_4$ is about 10% by weight in the composition. In some embodiments, the composition further contains $Ca(OH)_2$ ranging from about 5% to about 12% by weight. In some embodiments, the $C_3S$ ranges from about 45% to about 75% by weight in the composition, and the $FeSO_4$ ranges from about 4% to about 15% by weight in the composition.

In some embodiments, the composition has a bulk specific gravity ranging from about 0.7 to about 1.2. In some embodiments, the composition has a pH value ranging from about 9.0 to about 13.0.

Another aspect of the disclosure provides a mixture including the binder composition described herein and a toxic-containing material.

In some embodiments, the binder composition and the toxic-containing material are in a ratio such that a sediment formed from the composition and the material under about 4° C. reaches a strength of about 100 kPa within seven days in an unconfined compression test.

In some embodiments, the binder composition ranges from about 7% to about 15% by weight in the mixture.

In some embodiments, the toxic-containing material is soil. In some embodiments, the soil contains a toxic selected from the group consisting of lead, arsenic, fluorine, boron, mercury, selenium, hexavalent chromium, cadmium, and the like.

A further aspect of the disclosure provides a method of immobilizing a toxic-containing material. The method includes:

(a) mixing the composition described herein with the toxic-containing material to form a mixture; and (b) allowing the mixture to form an immobilized sediment.

In some embodiments, step (b) takes place at a temperature of at or below about 10° C., at or below about 6° C., or at or below about 4° C.

In some embodiments, the binder composition and the toxic-containing material is mixed in a ratio such that the immobilized sediment reaches a strength of about 100 kPa at or below about 4° C. within seven days.

In some embodiments, the method further includes, during or prior to step (a), adjusting the amount of $C_3S$ in the binder composition to control the rate of the immobilized sediment developing a strength of about 100 kPa according to UC test during a curing period in step (b).

In some embodiments, moisture content of the immobilized sediment varies by less than 5% from the seventh day through the twenty-eighth day during a curing period in step (b).

In some embodiments, the toxic-containing material is dredged or excavated soil.

DETAILED DESCRIPTION

Figure 1:
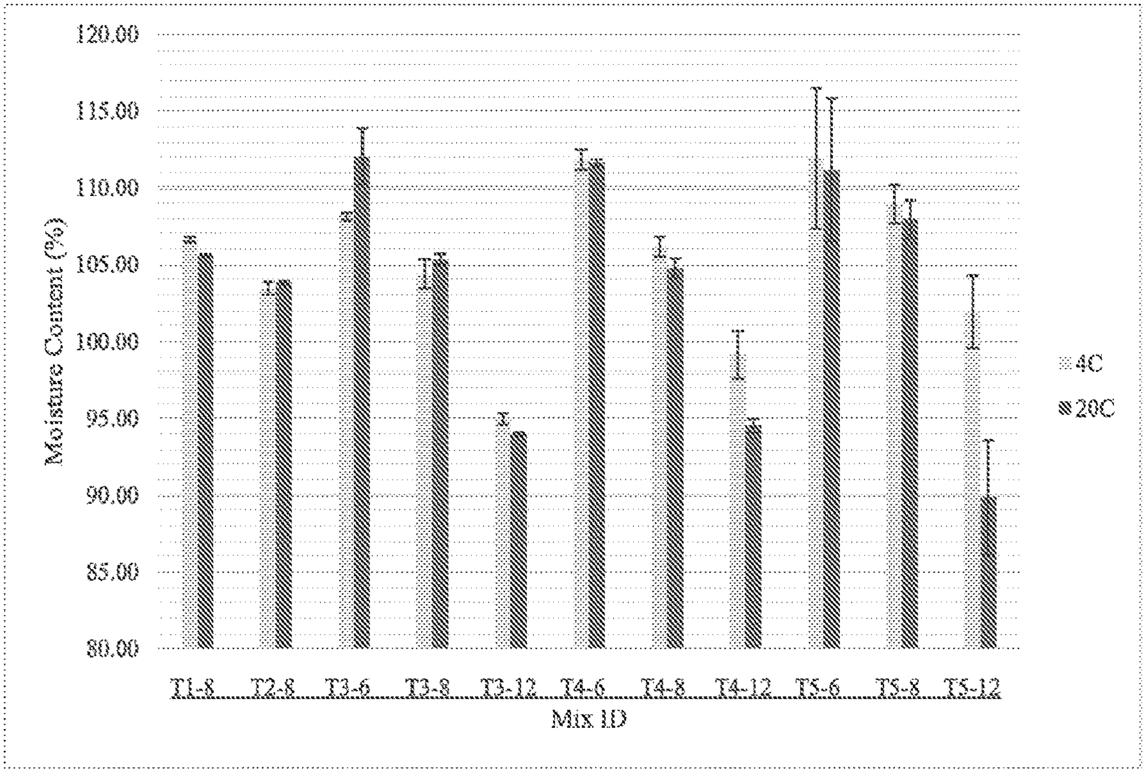
FIG. 1 illustrates results of a 7-Day Moisture Content study for exemplified binder compositions.

Some examples of the present disclosure will now be described more fully hereinafter with reference to the accompanying drawings, in which some, but not all examples of the disclosure are shown. Indeed, various aspects of the disclosure may be embodied in many different forms and should not be construed as limited to the examples set forth herein. Rather, these examples are provided so that this disclosure will be thorough and complete and will fully convey the scope of the disclosure to those skilled in the art. Like reference numerals refer to like elements throughout.

The following detailed description is merely illustrative in nature and is not intended to limit the implementations of the subject matter or the application and uses of such implementations. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The articles "a" and "an" as used herein refers to "one or more" or "at least one," unless otherwise indicated. That is, reference to any element or component of an embodiment by the indefinite article "a" or "an" does not exclude the possibility that more than one element or component is present.

The term "about" as used herein refers to the referenced numeric indication plus or minus 10% of that referenced numeric indication.

An aspect of this patent document provides a binder composition for immobilizing a toxic-containing material. The binder composition generally includes a calcium silicate-containing composition having hydration reactivity and a sulfate salt. The calcium silicate-containing composition and the sulfate are selected so that the binder composition is capable of forming an immobilized sediment at 4° C. in about 7 days after being mixed with the toxic-containing material, thereby immobilizing the toxic-containing material.

The calcium silicate-containing composition can set and harden by hydration. Non-limiting examples of the calcium silicate-containing composition include cement, blast furnace slag fine powder, fly ash, and clinker ash. Non-limiting examples of the sulfate include calcium sulfate, magnesium sulfate, ferrous sulfate in hydrate or anhydrous form. In some embodiments, the calcium silicate-containing composition contains calcium sulphate. Calcium sulfate can be in the form of gypsum (calcium sulphate dihydrate, $CaSO_4 \cdot ½H_2O$), hemi-hydrate ($CaSO_4 \cdot ½H_2O$), anhydrite (anhydrous calcium, sulfate, $CaSO_4$) or mixtures thereof. The gypsum and anhydrite exist in the natural state. Calcium sulfate produced as a by-product (e.g. blast furnace slag fine powder, fly ash, and clinker ash) of certain industrial processes may also be used.

In some embodiments, the calcium silicate-containing composition is a hydraulic cement and contains $(CaO)_3 \cdot SiO_2$ ($C_3S$), wherein the $C_3S$ is more than about 60% by weight in the composition; and anhydrous $CaSO_4$ or anhydrous $FeSO_4$. Hydraulic cement is known to harden by reacting with water. The resulting product is generally water-resistant. Portland cement is an example of hydraulic cement:

Additional components in hydraulic cement includes for example $(CaO)_2 \cdot SiO_2(C_2S)$, $(CaO)_3 \cdot Al_2O_3$ and $(CaO)_4 \cdot Al_2O_3 \cdot Fe_2O_3$. It is discovered that by controlling the amount of the $C_3S$ in the composition for mixing with a material to be immobilized, the strength of the resulting sediment can be significantly improved. The rate of reaching certain levels of strength can also be controlled. For instance, higher $C_3S$ content can lead to higher early strength. Further, the curing process can take place at a relatively lower temperature within a shorter period of time in comparison with conventional cements.

In some embodiments, the $C_3S$ ranges from about 45% to about 80%, from about 55% to about 80%, from about 60% to about 80%, from about 60% to about 80%, from about 65% to about 80%, from about 65% to about 75%, from about 65% to about 70%, or from about 70% to about 75%, by weight in the binder composition. Non-limiting examples of the weight of $C_3S$ in the binder composition include about 45%, about 55%, about 65%, and about 75%.

The presence of anhydrous gypsum ($CaSO_4$) or anhydrous iron salt (e.g. $FeSO_4$) further improves the strength of the sediment cured under low temperature. In some embodiments, the anhydrous $CaSO_4$ or the anhydrous $FeSO_4$ ranges from about 4% to about 20%, from about 4% to about 15%, from about 5% to about 10%, from about 8% to about 20%, from about 8% to about 15%, from about 5% to about 12%, from about 8% to about 12%, from about 10% to about 15%, from about 8% to about 10%, or from about 10% to about 12% by weight in the composition. Non-limiting examples of the weight of anhydrous $CaSO_4$ or anhydrous $FeSO_4$ independently includes about 4%, about 8%, about 12%, about 16%, and about 20% in the binder composition.

In some further embodiments of the binder composition, the $C_3S$ ranges from about 65% to about 75% by weight in the composition, and the anhydrous $CaSO_4$ ranges from about 8% to about 12% by weight in the composition. In some embodiments, the $C_3S$ ranges from about 65% to about 70% by weight, and the anhydrous $CaSO_4$ ranges from about 8% to about 12% by weight. In some embodiments, the $C_3S$ ranges from about 70% to about 75% by weight, and the anhydrous $CaSO_4$ ranges from about 8% to about 12% by weight. In some embodiments, the $C_3S$ is about 68% by weight, and the anhydrous $CaSO_4$ is about 10% by weight. In some embodiments, the $C_3S$ is about 74% by weight, and the anhydrous $CaSO_4$ is about 10% by weight.

The addition of $Ca(OH)_2$ can impede toxic leaching from the immobilized material, especially for materials containing heavy metals. Accordingly, in some embodiments, the $C_3S$ ranges from about 65% to about 70% by weight in the binder composition, the anhydrous $CaSO_4$ ranges from about 8% to about 12% by weight in the binder composition, and the composition further includes $Ca(OH)_2$ ranging from about 8% to about 12% by weight in the binder composition. In some embodiments, the $C_3S$ is about 68% by weight, the anhydrous $CaSO_4$ is about 10% by weight, and the $Ca(OH)_2$ is about 10% by weight.

Although a low amount of $FeSO_4$ contributes little to the strength of the immobilized material, at an increased dosage in the binder composition, the improvement becomes obvious. In some embodiments, the composition contains about $FeSO_4$ ranging from about 8% to about 15%, from about 10% to about 15%, or from about 11% to about 13% by weight. In some embodiments, the composition contains about 68% $C_3S$ and about 12% $FeSO_4$ by weight. The $FeSO_4$ can be anhydrous or in the form of a monohydrate.

Additional components can be included in the binder composition, including for example, MgO, $Mg(OH)_2$, Gypsum, Basanite, Calcite, and any combination thereof.

The bulk specific gravity of the binder composition may vary depending on the specific constituents and their percentages in the composition. In some embodiments, the composition has a bulk specific gravity ranging from about 0.6 to about 2.0, from about 0.6 to about 1.8, from about 0.6 to about 1.7, from about 0.8 to about 1.7, from about 1.0 to about 1.5, from about 0.6 to about 1.2, from about 0.7 to about 1.0, or from about 0.7 to about 1.0, or from about 0.8 to about 0.9. Non-limiting examples of the bulk specific gravity of the composition includes about 0.6, about 0.8, about 1.0, about 1.2, about 1.5 and about 1.7.

The pH value of the composition also depends on the specific constituents of the composition. In some embodiments, the pH ranges from about 8.0 to about 13.0 or from about 9.0 to about 12.7. Non-limiting examples of the pH of the composition includes about 8.0, about 8.5, about 9.0, about 9.5, about 10.0, about 10.5, about 11.0, about 11.5, about 12.0, and about 12.5.

Another aspect provides a mixture of the binder composition described in this patent document and a toxic-containing material. The mixture solidifies and stabilizes over a certain period of time, entrapping and immobilizing the toxic therein. Various types of toxic-containing material can thus be turned into construction or building materials. For instance, dredged or excavated soil containing arsenic can be mixed with the composition of this patent document to form a new sediment or concrete material as a foundation for construction of private or public buildings, parks, and lots.

Toxic in the material that can be entrapped includes for example lead, arsenic, fluorine, boron, mercury, selenium, hexavalent chromium, cadmium, any derivative thereof and any combination thereof. In some embodiments, the $C_3S$ ranges from about 65% to about 75% by weight in the binder composition before being mixed with the toxic-containing material, and the anhydrous $CaSO_4$ ranges from about 8% to about 12% by weight. In some embodiments, the $C_3S$ ranges from about 65% to about 75% by weight in the binder composition, and the $FeSO_4$ ranges from about 10% to about 15% by weight in the binder composition.

Another aspect provides a method of immobilizing a toxic-containing material. The method generally includes the steps of (a) mixing the binder composition described in this patent document with the toxic-containing material to form a mixture; and (b) allowing the mixture to cure and form an immobilized sediment.

The amounts of the material and the composition to be mixed depend on factors including for example their specific constituents and the desirable strength of the resulting sediment. One of ordinary skill in the art will be able to identify the suitable amounts without undue experiments.

After mixing with the material to be treated, the composition of this patent document is capable of curing under low temperature and meanwhile reaching a high strength suitable for construction purpose. Accordingly, in some embodiments, the binder composition and the material is mixed in a ratio such that the immobilized sediment (formed at or below about 4° C. by day 7 from initial mixing) reaches a strength of about 100 kPa in a unconfined compression test.

The ratio or relative percentages of the composition and the toxic-containing material can also be adjusted so that the sediment (formed at or below about 4° C. by day 7 from initial mixing) reaches a strength of about 110 kPa, about 120 kPa, about 130 kPa, about 140 kPa, about 150 kPa, about 160 kPa, about 170 kPa, about 180 kPa, about 190 kPa, or about 200 kPa in a UC strength test.

The strength of the sediment formed from the composition and the toxic-containing material can also be measure with consolidated undrained triaxial compression (CU) tests. Accordingly in some embodiments, the composition and the material is mixed in a ratio such that the immobilized sediment (formed at or below about 20° C. by day 28 from initial mixing) reaches a strength of about 300 kPa, about 320 kPa, about 340 kPa, about 360 kPa, about 380 kPa, about 400 kPa, or about 420 kPa in a triaxial CU test.

UC strength test is a standard industrial test. The procedure to perform CU test is similarly known in the field.

In some embodiments, the composition accounts for about 5%, 6%, 7%, 8%, 9%, 10%, 11%, 12%, 13%, 14%, 15%, 16%, 18%, 19%, or 20% by weight in its mixture with toxic-containing material. In some embodiments, the composition ranges from about 5% to about 10%, from about 10% to about 15%, from about 15% to about 20%, from about 7% to about 9%, from about 10% to about 12%, or from about 13% to about 15% by weight in its mixture with toxic-containing material.

A significant advantage of the method is the formation of sediment of high strength under low temperature. In some embodiments, the temperature of step b is at or below about 4° C., at or below about 2° C., at or below about 0° C., or at or below about −2° C.

In order to adjust the rate of reaching certain levels of strength for the immobilized sediment, the amount of $C_3S$, the sulfate (e.g. $CaSO_4$ or $FeSO_4$), and/or $Ca(OH)_2$ in the binder composition can be further adjusted during or prior to step (a). It should be noted that ferrous sulfate also serves to reduce the transport of select metal species as well as minimizing or eliminating PAH leaching. If the calcium silicate-containing composition is sourced from blast furnace slag fine powder, fly ash, clinker ash or other industrial side product, the method may include a step to adjust or add necessary components (e.g. $C_3S$, sulfate, and/or $Ca(OH)_2$) to arrive at the desired binding composition. In some embodiments, the target level of strength is more than 80 kPa, more than 90 kPa, more than 100 kPa, more than 120 kPa, more than 140 kPa, more than 160 kPa, or more than 200 kPa within a period of 5 days, 7 days, 14 days, 28 days or 35 days after the mixing step (a). The temperature during the period is lower than 30° C., lower than 20° C., lower than 10° C., lower than 4° C., or lower than 2° C. If necessary, the moisture content of the mixture can also be adjusted before or during step (a).

In some embodiments, the moisture content of the immobilized sediment varies by less than 5%, less than 8%, less than 10%, or less than 15% from the seventh day through the twenty-eighth day during a curing period in step (b).

Various toxic-containing materials can be immobilized according to this method. In some embodiments, the material is dredged or excavated soil. In some embodiments, the material contains a toxic that has an element selected from lead, arsenic, fluorine, boron, mercury, selenium, hexavalent chromium, and cadmium.

EXAMPLES

Figure 6:
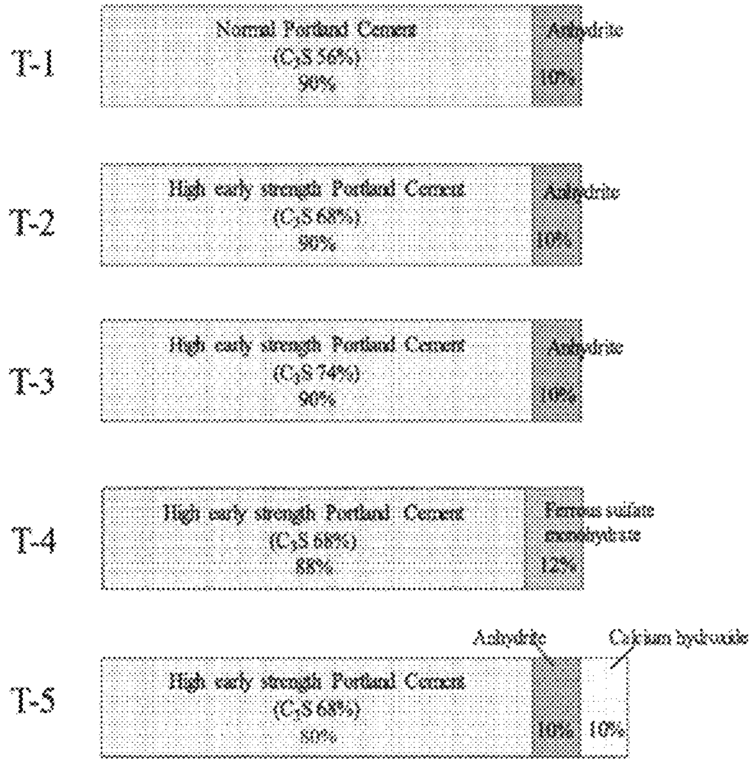
FIG. 6 illustrates binder compositions for exemplified test binders.

Five different binder compositions were prepared as summarized in FIG. 6. Test Binder-Type 1 (T-1) and test Binder-Type 2 (T-2) were developed to initiate the understanding of new binder compositions from the perspective of strength gain in cold temperatures. The incorporation of anhydrite (gypsum) helped produce more ettringite, resulting in a more rigid stabilized product. Test Binder-Type 3 (T-3), test Binder-Type 4 (T-4), and test Binder-Type 5 (T-5) were refined versions of the earlier developed binders and targeted the strength gain as well as contaminant containment. T-3 differed from the others in its $C_3S$ content, which was responsible for early strength gain. T-4 was developed specifically to reduce the solubility of heavy metals and similarly behaving contaminants through the addition of ferrous sulfate monohydrate into the structure of high early strength cement. T-5 was improved by the addition of calcium hydroxide to enhance the formation calcium carbonate via scavenging $CO_2$ from the atmosphere. Eleven mixes were generated for the study using the five specialized test binders.

Table 1 summarizes the components in the base Portland cement. Table 2 summarizes the components in the binder composition.

TABLE 1

Mineral Components of Base Portland Cement

| | $C_3S$ | $C_2S$ | $C_3A$ | $C_4AF$ | MgO | Gypsum | Basanite | Calcite |
|---|---|---|---|---|---|---|---|---|
| Base cement of T-3 | 73.95 | 4.36 | 5.42 | 10.41 | 0.95 | 1.75 | 3.06 | 0.11 |
| Base cement of T-4 | 67.74 | 9.89 | 8.07 | 9.89 | 0.28 | 2.12 | 1.61 | 0.40 |

TABLE 2

Mineral Components of Binder Composition T-3 and T4

| | $C_3S$ | $C_2S$ | $C_3A$ | $C_4AF$ | MgO | Gypsum | Basanite | Calcite | Anhydrite | Ferrous sulfate monohydrate |
|---|---|---|---|---|---|---|---|---|---|---|
| T-3 | 66.56 | 3.92 | 4.88 | 9.36 | 0.86 | 1.58 | 2.75 | 0.10 | 10.00 | 0.00 |
| T-4 | 59.61 | 8.70 | 7.10 | 8.70 | 0.25 | 1.87 | 1.42 | 0.35 | 0.00 | 12.00 |

Table 3 presents a summary of the designed mixes. The "total Binder %" (by wet weight of sediment) refers to the percentage of the binder upon mixing with a toxic-containing material. The samples generated by this study were tested for UC strength and moisture content after 7 and 28 days. Upon the completion of these tests, samples of material from the broken cores were sent to Precision Testing Laboratories for SPLP analysis to assess the binder's stabilization performance for target compounds. Moisture content were determined by drying the specimens after unconfined compression test at the age of 7 and 28 days, in accordance with ASTM D2974-14. Additional samples of the material were generated and cured for 28 days in order to conduct CU strength triaxial testing.

TABLE 3

Designed Mixes

| Mixture ID | Binder(s) | Total Binder % (by wet weight of sediment) |
|---|---|---|
| T1-8 | Test Binder - Type 1 | 8.0 |
| T2-8 | Test Binder - Type 2 | 8.0 |
| T3-6 | Test Binder - Type 3 | 6.0 |
| T3-8 | Test Binder - Type 3 | 8.0 |
| T3-12 | Test Binder - Type 3 | 12.0 |
| T4-6 | Test Binder - Type 4 | 6.0 |
| T4-8 | Test Binder - Type 4 | 8.0 |
| T4-12 | Test Binder - Type 4 | 12.0 |
| T5-6 | Test Binder - Type 5 | 6.0 |
| T5-8 | Test Binder - Type 5 | 8.0 |
| T5-12 | Test Binder - Type 5 | 12.0 |

Figure 2:
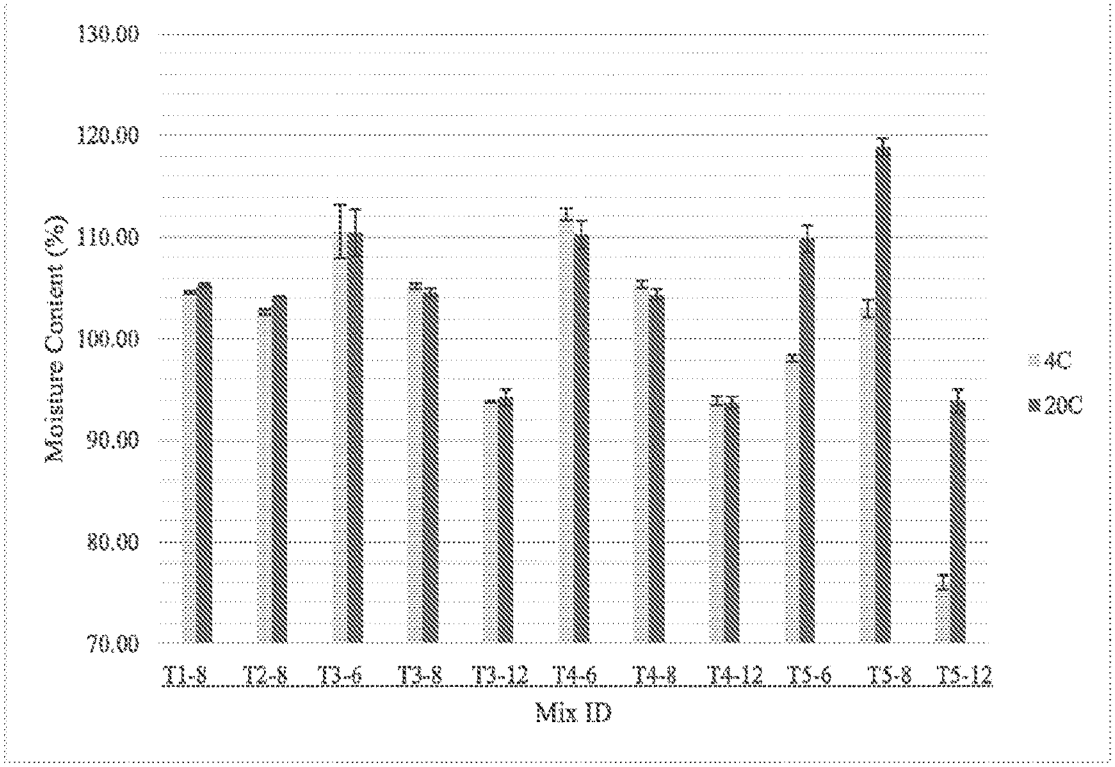
FIG. 2 illustrates results of a 28-Day Moisture Content study for exemplified binder compositions.

FIGS. 1 and 2 present the moisture content test results after 7 and 28 days of curing at both 4° C. and 20° C. The results are also summarized in Table 4. It should be noted that the moisture content of raw sediment was 135% and therefore there was an expected drop in the moisture content due to cement hydration and other chemical reactions, which consumed the available water in the sediment matrix. This resulted in volume change in the sediment and the mixture shrank in over time. Generally, a higher curing temperature and increased binder content resulted in larger moisture content decrease regardless of the type of the pozzolanic binder.

TABLE 4

Summary of Moisture Content Results

| Mixture ID | Binder(s) | Average Moisture Content (%) 7 days 4 °C | 7 days 20 °C | 28 days 4 °C | 28 days 20 °C |
|---|---|---|---|---|---|
| T1-8 | Test Binder - Type 1 | 107 | 105 | 106 | 105 |
| T2-8 | Test Binder - Type 2 | 103 | 103 | 104 | 104 |
| T3-6 | Test Binder - Type 3 | 108 | 111 | 112 | 110 |
| T3-8 | Test Binder - Type 3 | 104 | 105 | 105 | 105 |
| T3-12 | Test Binder - Type 3 | 95 | 94 | 94 | 94 |
| T4-6 | Test Binder - Type 4 | 112 | 112 | 112 | 110 |
| T4-8 | Test Binder - Type 4 | 106 | 105 | 105 | 104 |
| T4-12 | Test Binder - Type 4 | 99 | 94 | 95 | 94 |
| T5-6 | Test Binder - Type 5 | 112 | 113 | 111 | 113 |
| T5-8 | Test Binder - Type 5 | 109 | 105 | 108 | 108 |
| T5-12 | Test Binder - Type 5 | 102 | 94 | 90 | 90 |

Figure 3:
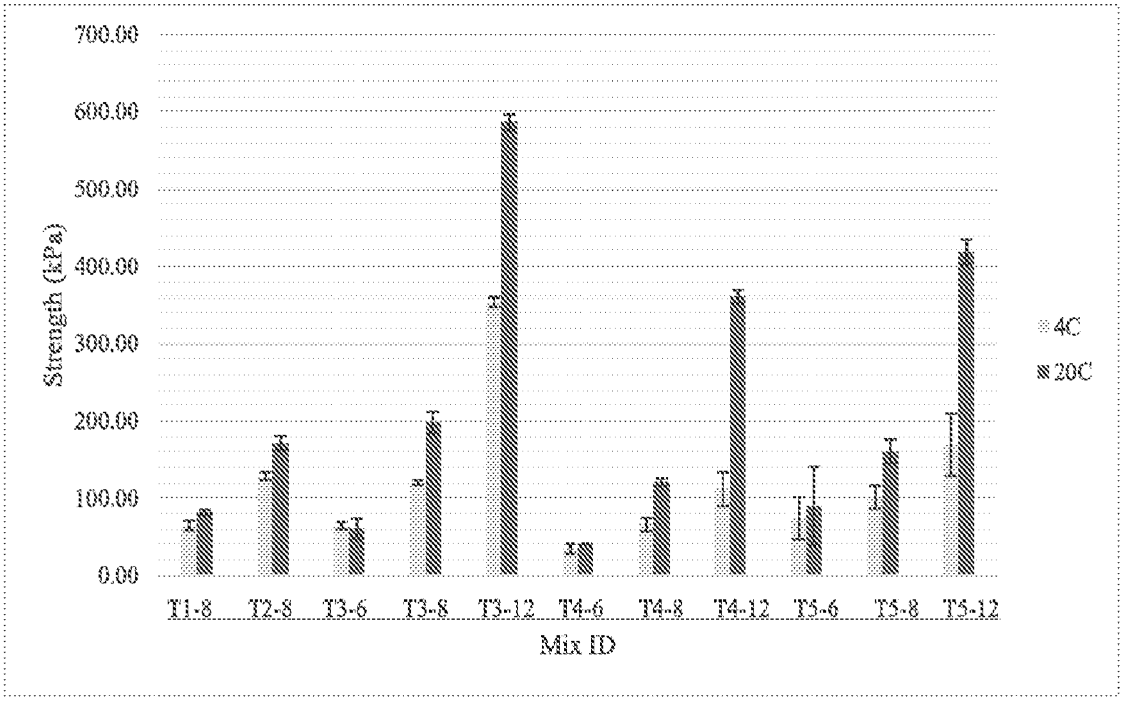
FIG. 3 illustrates results of a 7-Day UC strength study for exemplified binder compositions.
Figure 4:
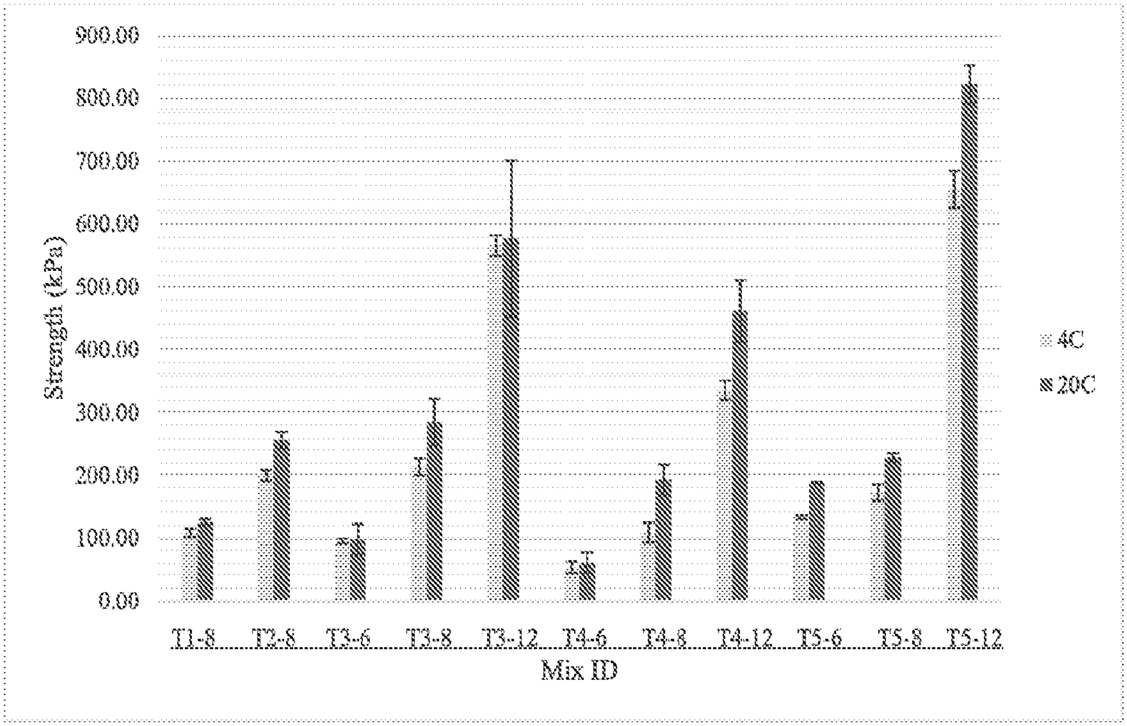
FIG. 4 illustrates results of a 28-Day UC strength study for exemplified binder compositions.

FIGS. 3 and 4 present the results of UC strength tests completed on samples cured at 4° C. and 20° C. for 7 and 28 days. The results are also summarized in Table 5. Higher $C_3S$ content resulted in higher early strength; therefore, T-3 outperformed the other binder types after 7 days of curing. A higher strength gain was associated with a higher temperature of curing for both short term (7 days) and long term (28 days) curing periods. The addition of calcium hydroxide in T-5 resulted in higher strength at 28 days compared to T-3. This can be attributed to the carbonation, which is the result of the reaction between calcium hydroxide and carbon dioxide.

TABLE 5

| Summary of UC Strength | | | | | |
|---|---|---|---|---|---|
| | | Average UC Strength (kPa) | | | |
| Mixture | | 7 days | | 28 days | |
| ID | Binder(s) | 4 °C | 20 °C | 4 °C | 20 °C |
| T1-8 | Test Binder - Type 1 | 65 | 108 | 82 | 125 |
| T2-8 | Test Binder - Type 2 | 128 | 200 | 171 | 255 |
| T3-6 | Test Binder - Type 3 | 64 | 96 | 61 | 98 |
| T3-8 | Test Binder - Type 3 | 120 | 213 | 198 | 284 |
| T3-12 | Test Binder - Type 3 | 354 | 565 | 587 | 577 |
| T4-6 | Test Binder - Type 4 | 35 | 54 | 41 | 60 |
| T4-8 | Test Binder - Type 4 | 66 | 109 | 120 | 192 |
| T4-12 | Test Binder - Type 4 | 112 | 335 | 361 | 461 |
| T5-6 | Test Binder - Type 5 | 74 | 92 | 90 | 105 |
| T5-8 | Test Binder - Type 5 | 102 | 210 | 161 | 187 |
| T5-12 | Test Binder - Type 5 | 169 | 390 | 501 | 338 |

Between 7 days and 28 days the strength gain of samples cured at 4° C. improved significantly for all types of binders. The purpose of this study was to develop a new binder that performs better than ordinary PC at low temperature. FIG. 4 confirms the superior performance of the developed binders at low temperature.

Figure 5:
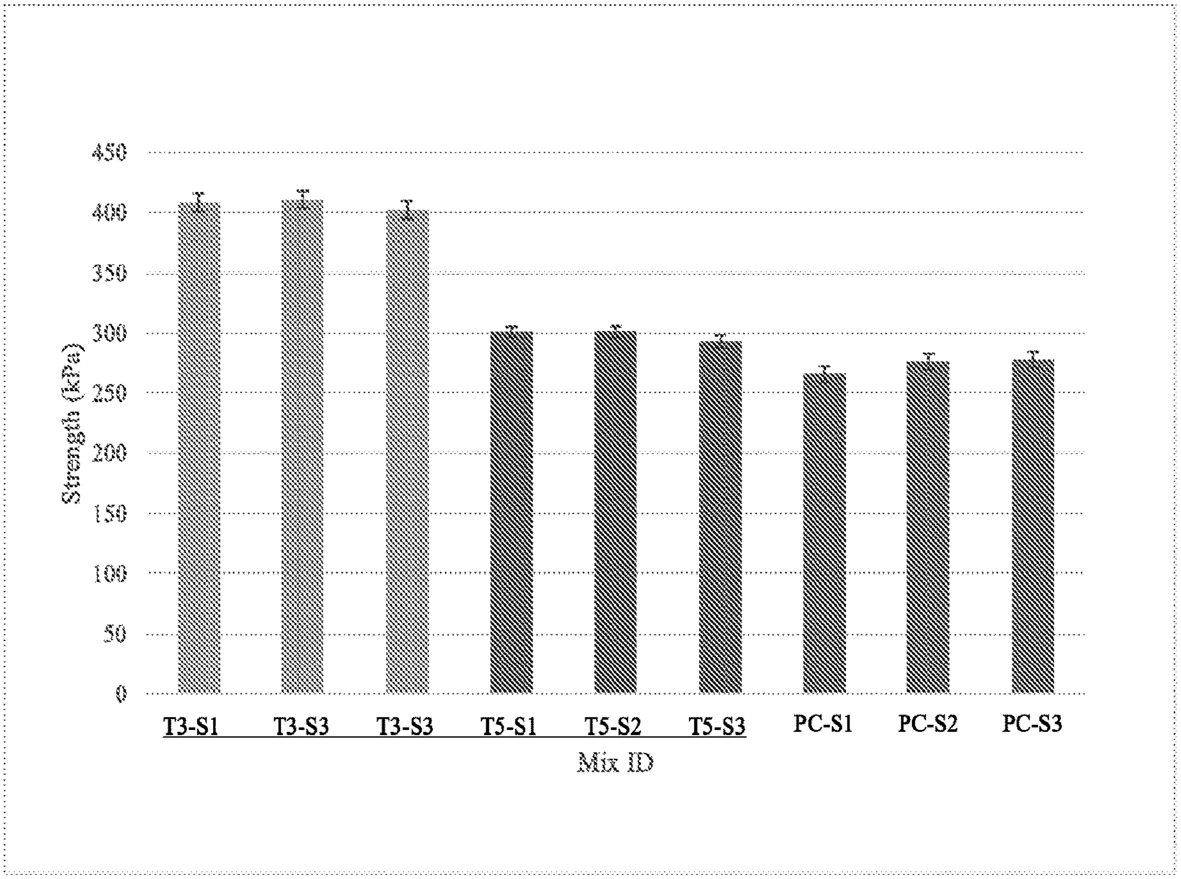
FIG. 5 illustrates results of a 28-Day Triaxial CU Strength study for exemplified binder compositions.

FIG. 5 presents the results of consolidated undrained triaxial compression (CU) tests completed on samples consisting of 8% PC, T-3, and T-5. The test procedure followed ASTM D2850-15. The samples were cured for 28 days at 20° C., then tested in the ELE Triaxial setup for strength evaluation under a relatively small confining pressure (34 kPa). As can be seen in FIG. 5, the CU test results for 8% PC and T-5 were very similar, while the results for T-3 demonstrated superior performance. Overall, the CU results show slight improvement compared to the UC test results, which can be attributed to the application of a confining pressure.

The samples created for this experiment were submitted to Precision Testing Laboratories in Toms River, NJ for two phases of SPLP testing. The first phase of samples included untreated (raw) sediment, as well as samples stabilized with 6% binder (T-3 and T-4) and cured at 4° C. for 7 days. These samples represented the worst-case scenario for stabilization potential, with the lowest binder ratio, curing time, and temperature. The second round of samples submitted for SPLP included 8% T-3, 8% T-5, and 8% PC. These samples were from the broken sample cores used for the CU tests cured for 28 days at 20° C. Tables 6 and 7 provide the SPLP concentrations for semivolatile organics (PAHs) and TAL metals reported by the laboratory, as well as the New Jersey Class II-A Ground Water Criterion for each compound.

For this study, SPLP concentration values were compared to New Jersey Class II-A Ground Water Criteria. The procedure does not represent the combined effects of stabilization and solidification, as the samples must be crushed in order to conduct the test and thus do not behave as solid monoliths.

TABLE 6

| SPLP Results: Semivolatile Organics | | | | | | | | | | |
|---|---|---|---|---|---|---|---|---|---|---|
| | SPLP Concentration (μg/L) | | | | | | | | | NJ Class II-A |
| Chemical | Untreated Sediment | 6% T-3 | 6% T-4 | 8% T-3 | | 8% T-5 | | 8% Portland Cement | | Ground Water Criterion |
| Compound | Sample 1 | Sample 1 | Sample 1 | Sample 1 | Sample 2 | Sample 1 | Sample 2 | Sample 1 | Sample 2 | (μg/L) |
| Acenaphthene | ND | ND | ND | 7.7 | 9.57 | 9.06 | 9.43 | 8.41 | 9.41 | 400 |
| Acenaphthylene | ND | ND | ND | ND | ND | ND | ND | ND | ND | — |
| Anthracene | ND | ND | ND | 1.94 | 2.12 | 2.01 | 2.18 | 1.91 | 2.14 | 2000 |
| Benzo(a)anthracene | ND | ND | ND | ND | 0.18 | 0.15 | 0.18 | 0.13 | 0.15 | 0.1 |
| Benzo(a)pyrene | ND | ND | ND | ND | ND | ND | ND | ND | ND | 0.1 |
| Benzo(b)fluoranthene | ND | ND | ND | ND | ND | ND | ND | ND | ND | 0.2 |
| Benzo(g,h,i)perylene | ND | ND | ND | ND | ND | ND | ND | ND | ND | — |
| Benzo(k)fluoranthene | ND | ND | ND | ND | ND | ND | ND | ND | ND | 0.5 |
| Chrysene | ND | ND | ND | ND | ND | ND | ND | ND | ND | 5 |
| Dibenz(a,h)anthracene | ND | ND | ND | ND | ND | ND | ND | ND | ND | 0.005 |
| Fluoranthene | ND | ND | ND | 1.71 | 2.09 | 2.09 | 2.26 | 1.97 | 2.23 | 300 |
| Fluorene | ND | ND | ND | 6.56 | 7.99 | 7.68 | 7.93 | 6.86 | 8.13 | 300 |
| Indeno(1,2,3-cd)pyrene | ND | ND | ND | ND | ND | ND | ND | ND | ND | 0.05 |
| Naphthalene | ND | ND | 0.32 | 5.67 | 7.59 | 6.79 | 7.32 | 4.14 | 4.98 | 300 |
| Phenanthrene | 0.31 | 0.18 | 0.39 | 9.31 | 11.2 | 10.7 | 11.2 | 5.74 | 6.66 | — |
| Pyrene | ND | ND | ND | 0.91 | 1.16 | 1.17 | 1.24 | 9.66 | 11 | 200 |
| Methylnaphthalene (2) | ND | ND | ND | 4.93 | 5.63 | 5.04 | 5.44 | 1.06 | 1.2 | — |

TABLE 7

SPLP Results: Metals

| Chemical Compound | SPLP Concentration (μg/L) Untreated Sediment Sample 1 | 6% T-3 Sample 1 | 6% T-4 Sample 1 | 8% T-3 Sample 1 | 8% T-3 Sample 2 | 8% T-5 Sample 1 |
|---|---|---|---|---|---|---|
| Aluminum | 6,560 | 6,870 | 4,020 | 2,900 | 2,890 | 3,430 |
| Antimony | 9.53 | 6.70 | 3.73 | 9.18 | 6.16 | 7.18 |
| Arsenic | 51.2 | 54.1 | 26.7 | 7.39 | 8.11 | 8.35 |
| Barium | 392 | 399 | 210 | 472 | 448 | 443 |
| Beryllium | 0.38 | 0.44 | 0.20 | 0.30 | 0.27 | 0.32 |
| Cadmium | 2.71 | 2.63 | 1.49 | ND | ND | ND |
| Calcium | 7,460 | 23,900 | 25,600 | 145,000 | 144,000 | 148,000 |
| Chromium | 77.8 | 75.6 | 39.8 | 5.22 | 8.42 | 0.69 |
| Cobalt | 4.09 | 4.32 | 2.49 | ND | ND | ND |
| Copper | 303 | 293 | 151 | 25.1 | 36.7 | 9.44 |
| Iron | 122,00 | 12,600 | 7,360 | 19.2 | 11.8 | 17.3 |
| Lead | 275 | 266 | 141 | ND | ND | ND |
| Magnesium | 4130 | 3,060 | 1,550 | 161 | 197 | 176 |
| Manganese | 115 | 129 | 73.5 | ND | ND | ND |
| Mercury | 3.71 | 2.96 | 1.82 | ND | ND | ND |
| Nickel | 26.9 | 26.8 | 17.3 | 88.5 | 96.7 | 86.2 |
| Potassium | 2,400 | 1,810 | 1,960 | 20,400 | 20,200 | 20,500 |
| Selenium | 5.29 | 7.35 | 7.52 | 22.4 | 23.3 | 22.8 |
| Silver | 1.47 | 1.38 | ND | ND | ND | ND |
| Sodium | 17,100 | 6,910 | 14,100 | 234,000 | 236,000 | 241,000 |
| Thallium | ND | ND | ND | ND | ND | ND |
| Vanadium | 17.3 | 18.3 | 11.3 | 7.06 | 6.77 | 5.92 |
| Zinc | 316 | 319 | 172 | 6.68 | 9.34 | 7.48 |

| Chemical Compound | SPLP Concentration (μg/L) 8% T-5 Sample 2 | 8% Portland Cement Sample 1 | 8% Portland Cement Sample 2 | NJ Class II-A Ground Water Criterion (μg/L) |
|---|---|---|---|---|
| Aluminum | 3,540 | 2,440 | 2,700 | 200 |
| Antimony | 8.00 | 7.47 | 6.48 | 6.00 |
| Arsenic | 7.63 | 8.11 | 7.55 | 3.00 |
| Barium | 450 | 392 | 368 | 6,000 |
| Beryllium | 0.26 | 0.25 | 0.26 | 1.00 |
| Cadmium | ND | ND | ND | 4.00 |
| Calcium | 150,000 | 159,000 | 153,000 | — |
| Chromium | 0.99 | 26.6 | 29.7 | 70 |
| Cobalt | ND | ND | 2.45 | 100 |
| Copper | 21.6 | 310 | 371 | 1,300 |
| Iron | 13 | 119 | 137 | 300 |
| Lead | ND | ND | ND | 5 |
| Magnesium | 150 | 206 | 194 | — |
| Manganese | ND | 0.34 | 1.21 | 50 |
| Mercury | ND | ND | ND | 2 |
| Nickel | 95.4 | 144 | 142 | 100 |
| Potassium | 19,400 | 32,700 | 34,000 | — |
| Selenium | 23.8 | 42.7 | 44.2 | 40 |
| Silver | ND | ND | ND | 40 |
| Sodium | 230,000 | 195,000 | 200,000 | 50,000 |
| Thallium | ND | ND | ND | 2 |
| Vanadium | 5.4 | 10.1 | 9.85 | 60 |
| Zinc | 6.42 | 10.4 | 15.4 | 2,000 |

Many modifications and other examples of the disclosure set forth herein will come to mind to those skilled in the art to which this disclosure pertains, having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims.

Moreover, although the foregoing descriptions and the associated drawings describe aspects of the disclosure in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A binder composition for immobilizing a toxic-containing material, comprising:

a calcium silicate-containing composition having hydration reactivity selected from the group consisting of cement, blast furnace slag fine powder, fly ash, and clinker ash; and a sulfate salt comprising anhydrous or monohydrate form of $FeSO_4$ or anhydrous $CaSO_4$;

wherein the quantity of the calcium silicate-containing composition is selected to control the rate at which a mixture of a toxic containing material and the binder composition will cure to form an immobilized sediment at 4° C. within 7 days with a compression strength of at least 100 kPa, as measured by an unconfined compression test, when said binder composition is mixed with said toxic containing material in an amount between 5 wt % to about 20 wt %, thereby immobilizing the toxic-containing material.

2. The binder composition of claim 1, wherein the calcium silicate-containing composition comprises $(CaO)_3 \cdot SiO_2$ ($C_3S$), wherein the $C_3S$ is more than 45% to about 80% by weight in the binder composition; and the sulfate salt ranges from about 4% to about 15% by weight in the composition.

3. The binder composition of claim 2, wherein the calcium silicate-containing composition further comprises $(CaO)_2 \cdot SiO_2(C_2S)$, and at least one of $(CaO)_3 \cdot Al_2O_3(C_3A)$ and $(CaO)_4 \cdot Al_2O_3 \cdot Fe_2O_3(C_4AF)$.

4. The binder composition of claim 2, wherein the $C_3S$ ranges from about 55% to about 75% by weight in the composition, and the anhydrous $CaSO_4$ ranges from about 6% to about 12% by weight in the composition.

5. The binder composition of claim 2, wherein the $C_3S$ is over 60% by weight in the composition, and the anhydrous $CaSO_4$ is about 10% by weight in the composition.

6. The binder composition of claim 2, further comprising $Ca(OH)_2$ ranging from about 5% to about 12% by weight in the composition.

7. The binder composition of claim 2, wherein the $C_3S$ ranges from about 45% to about 75% by weight in the composition, and the $FeSO_4$ ranges from about 4% to about 15% by weight in the composition.

8. The binder composition of claim 2, further comprising a material selected from the group consisting of $CaCO_3$, MgO, $Mg(OH)_2$, Basanite, and Gypsum.

9. The binder composition of claim 1, which has a bulk specific gravity ranging from about 0.7 to about 1.7.

10. The binder composition of claim 1, which has a pH value ranging from about 9.0 to about 13.0.

11. A mixture comprising the binder composition of claim 1 and a toxic-containing material.

12. The mixture of claim 11, wherein the binder composition and the toxic-containing material are in a ratio such that a sediment formed from the composition and the material under about 4° C. reaches a strength of about 100 kPa within seven days in an unconfined compression test.

13. The mixture of claim 11, wherein the binder composition ranges from about 7% to about 15% by weight in the mixture.

14. The mixture of claim 11, wherein the toxic-containing material is soil, which contains a toxic selected from the group consisting of lead, arsenic, fluorine, boron, mercury, selenium, hexavalent chromium, and cadmium.

15. A method of immobilizing a toxic-containing material, comprising (a) mixing the binder composition of claim 1 with the toxic-containing material to form a mixture; and (b) allowing the mixture to cure and form an immobilized sediment.

16. The method of claim 15, wherein step (b) takes place at a temperature of at or below about 4° C.

17. The method of claim 15, wherein the binder composition and the toxic-containing material is mixed in a ratio such that the immobilized sediment reaches a strength of about 100 kPa at or below about 4° C. by the seventh day after step (a) in an unconfined compression test.

18. The method of claim 15, further comprising, during or prior to step (a), adjusting the amount of $C_3S$ in the binder composition to control the rate of the immobilized sediment developing a strength of about 100 kPa according to UC test during a curing period in step (b).

19. The method of claim 15, wherein moisture content of the immobilized sediment varies by less than 5% from the seventh day through the twenty-eighth day during a curing period in step (b).

* * * * *